Sept. 23, 1969     S. N. BISHOP ET AL     3,468,003

MANUFACTURING PROCESS

Filed April 21, 1966     2 Sheets-Sheet 1

INVENTORS
Samuel N. Bishop
Edward W. Grayson

BY *William Grobman*

ATTORNEY

Sept. 23, 1969   S. N. BISHOP ET AL   3,468,003
MANUFACTURING PROCESS

Filed April 21, 1966                     2 Sheets-Sheet 2

INVENTORS
Samuel N. Bishop
Edward W. Grayson

BY William Grohman

ATTORNEY

United States Patent Office 3,468,003
Patented Sept. 23, 1969

3,468,003
MANUFACTURING PROCESS
Samuel N. Bishop, Riverdale, and Edward W. Grayson, Lanham, Md., assignors to Singer-General Precision, Inc., a corporation of Delaware
Filed Apr. 21, 1966, Ser. No. 544,279
Int. Cl. B21k 21/06
U.S. Cl. 29—1.2      7 Claims

ABSTRACT OF THE DISCLOSURE

To achieve the close tolerances necessary for satisfactory operation of continuous rod warheads, the warheads were handmade. A large number of individual fashioning and assemblying operations were hand performed and checked at each step of the way. This is a method for manufacturing the same warheads which accomplishes the same results in much less time by producing separate subassemblies and storing the subassemblies until they are required for the assembly of a warhead. The method for forming cylinders of warhead rods was developed so that the cylinders can be assembled on the warhead without reducing the efficiency of the device. Rod stock is cut to the length of a fold, and pairs of the cut rods are welded together at one end. When a number of pairs of rods are thus formed, several pairs are welded together facing each other with one free end of one pair welded to a free end of each adjacent pair. In this manner a double thickness mat of rods is formed, which mat is then formed into a cylinder of rods. Each other subassembly is made separately, and the entire warhead is later assembled from the separate subassemblies.

---

This invention relates to manufacturing processes, and more particularly, to a process for manufacturing a device which comprises several parts which must be held to very close tolerances in both their construction and assembly.

In United States Patents 3,160,099, 3,223,037, 3,223,036, 3,224,371 and 3,224,372 assigned to the United States of America, there is described a warhead projectile which comprises a plurality of rods, each having a generally rectangular cross section, interconnected at their ends to form an expanding continuous ring when the warhead charge is detonated. As mentioned in the patents, the detonation of the high explosive charge used in the warhead applies a loading force of up to several million pounds per square inch to drive the continuous rod projectile into an outward expansion at a velocity of several thousand feet per second. Originally, the rods are arranged on the outer periphery of a cylinder in two or more lines to form a compact structure. The detonation will force the rods outwardly, and they will expand into a ring which is held together only by the fastening of the ends of the rods. The patents indicate that the ends of the rods are fastened together by welding. It is clear that the rapid expansion of the metallic ring at the rates mentioned above and in the patents requires uniformity in the reaction of all of the rods to the detonation. When one or two rods break before the rest, a hole is provided which may permit the target to pass through. The warhead has then failed its function. The Nooker patent 3,160,099 issued on Dec. 8, 1964 explains the operation of the warhead quite well and emphasizes the value of the welds which hold the ends of the rods together. However, there is more to manufacturing a warhead than welding the ends of the rods together. In the past, the classic process used in manufacturing a warhead of this type was to assemble it on a custom-built basis, one at a time, each one taking form on a mandrel. Each part was added to the assembly as it was needed, and sub-assemblies were seldom used. This type of construction is slow, tedious and expensive. One estimate indicates that approximately 132 man-hours are required to manufacture a single warhead following the classic method. With the methods outlined below, this time can be decreased to as low as 50 man-hours per warhead.

It is an object of this invention to provide a new and improved method for manufacturing.

It is another object of this invention to provide a new and improved process for the mass production of devices requiring close tolerances.

It is a further object of this invention to provide a new and improved method for manufacturing sub-assemblies of a complex assembly.

It is still another object of this invention to provide a new and improved process for the manufacture of warheads using principles of mass production.

Other objects and advantages of this invention will become apparent as the following description proceeds, which description should be considered together with the accompanying drawings in which.

Figure 6:
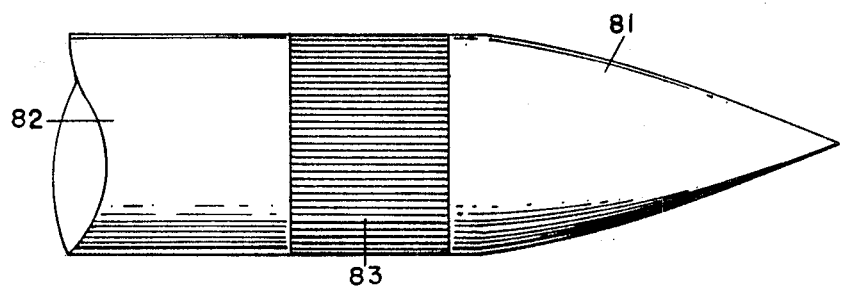
FIG. 6 is a side view of the warhead as it is shown in FIG. 3 of the Nooker patent.
Figure 7:
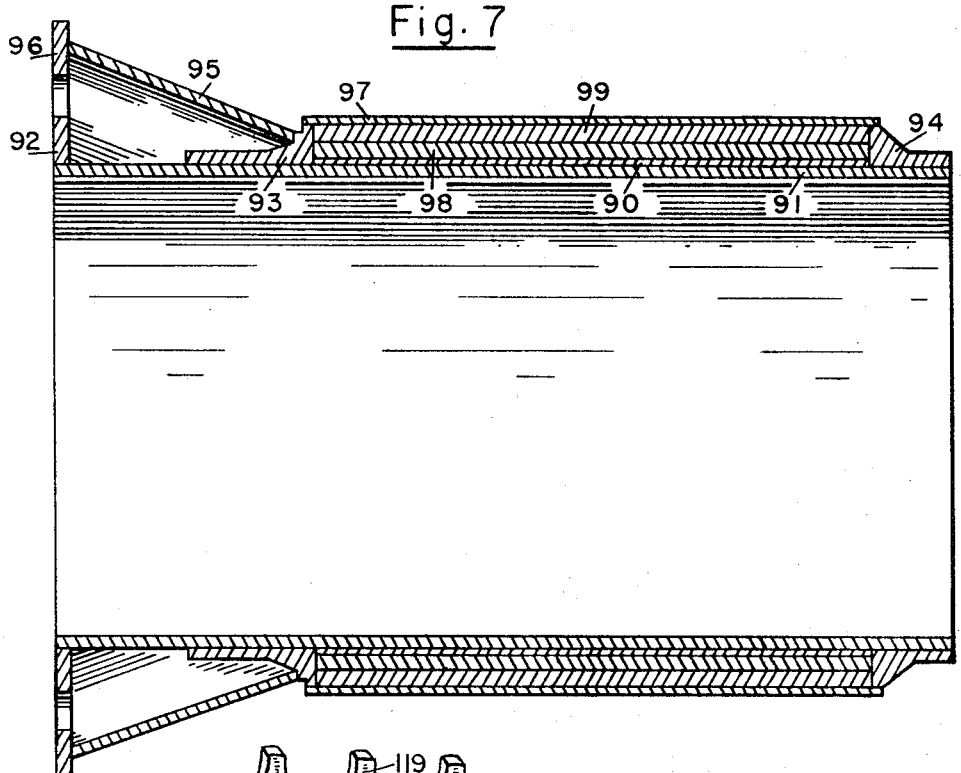
FIG. 7 is a sectional view of a portion of the assembled warhead itself.
Figure 8:
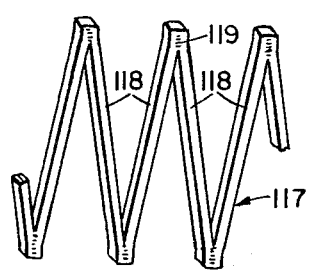
FIG. 8 is a perspective view of a portion of a partially expanded rod assembly.

Referring now to the drawings in detail, and particularly to FIG. 7, the reference character 91 designates a cylinder made of sheet metal. Mounted on one end, the aft end, of the cylinder 91 is a ring or flange 92 and spaced therefrom is a second ring 93. A third or forward ring 94 is mounted on the cylinder at the forward end. A cone 95 surrounds the aft end of the cylinder 91 and is supported against a shoulder formed in the middle ring 93. The aft end of the cone 95 has attached to it a cone ring (or flange) 96 which is axially aligned with, but radially spaced from, the aft ring 92. A double row of rods 98 and 99 fastened together in the form of a cylindrical shell as described in the above listed patents surrounds the cylinder 91 in the space between the center ring 93 and the forward ring 94. A lead skin 97 covers the rods 99 and the inside portions of the rings 93 and 94. When the rods are expanded somewhat, they appear as shown in FIG. 8. The rods themselves are designated 118 and are shown fastened together at the ends by welds 119. The rods 118 are cut from ¼" square stock steel to the correct length and then they are arranged in pairs. With two rods lying side by side, one end of each pair of rods is welded together as at 119. After a number of pairs have been welded together at one end, a free end of a rod of one pair is then welded to a free end of a rod from another pair to assemble the pairs into a mat 117. The rod assembly shown in FIG. 8 is a portion of a mat which has been pulled apart slightly at the ends to show how the rods 118 are fastened together. The two ends of a finished mat are fastened together to form a cylinder of rods which fits on a warhead 81 as shown at 83 in FIG. 6. When the warhead explodes, the cylinder 83 is rapidly expanded, with the rods 118 bending about the welds 119 as hinges. Referring to FIG. 8 again, the rods 118 are shown there partially extended. The expansion of the rod cylinder continues, however, until the rods 118 form a circle or until the cylinder breaks at a weak point. The expanding cylinder, hurtling through space, forms a formidable weapon of great size. Any breaks in the expanding cylinder provide holes through which a target can slip unharmed. For this reason, it is important that the rod assembly 117 be as uniform as possible.

The assembly shown in section in FIG. 7 is the cylinder portion 83 of the projectile shown in FIG. 6 which is also shown in several of the above mentioned patents. A nose 81 is attached to the forward end of the section 83, and a body portion 82 is fastened to the aft end of the same section. The structure shown in FIG. 7 forms the business portion of the rod warhead described in the patents. To assure reliable results, the assembly must be created with close tolerances. If the ring formed of the rods 98 and 99 is to expand uniformly, the rods 98 and 99 must separate from each other readily and uniformly. This means that the rods 98 and 99 throughout the circumference of the cylinder 91 must not stick to each other and must not be held more tightly between the rings 93 and 94 at one spot than at another. In addition, for economy of cost and material, it is desirable to produce this structure with as many interchangeable and uniform parts as possible. The process described herein achieves this desire.

FIGS. 1, 2, 3 and 4 present flow charts of the steps involved in the manufacture of the four major sub-assemblies which form the basis of the structure shown in FIG. 7. As mentioned above, the classic method for constructing the assembly of FIG. 7 is to form the cylinder 91 on a mandrel and then assemble each of the other elements onto the cylinder 91 while it is mounted on the mandrel. The individual rings 92, 93 and 94 are placed in position, machined and finished in place on the cylinder 91. The rods 98 and 99 are individually placed and fastened in position on the cylinder 91 until the entire assembly shown in FIG. 7 is complete. This, of course, has serious drawbacks. Defects occur in the most carefully constructed device, and a defect in any one part of the entire structure shown in FIG. 7, when constructed as described above, may well cause the rejection of the entire assembly. In addition, the manufacture of one part cannot proceed until its stage of the assembly is reached, requiring a substantial length of time to construct the device shown in FIG. 7.

Figure 1:
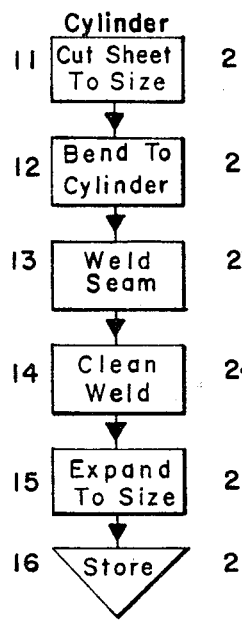
FIG. 1 is a flow chart illustrating the steps followed in manufacturing a cylinder for assembly according to the principles of this invention.

As shown in FIGS. 1 through 5, the present invention contemplates constructing at least four sub-assemblies, individually and separately, at the same time and then using the sub-assemblies as they are needed to form the final structure shown in FIG. 7. Referring to FIG. 1, the cylinder 91 is formed of sheet metal and the first step as shown in the block designated 11 is to cut the sheet metal to size. The next step in the manufacture of the cylinder 91 as shown in block 12 is to bend the sheet metal into the form of a cylinder. In step 13, the seam of the cylinder is welded and in step 14 the weld is cleaned. The cylinder 91 is placed on an expanding mandrel and, as shown in block 15, is expanded to the proper size. This step insures the final diameter to be within the required limits. The cylinder 91 is then taken from the mandrel and placed in storage to be used at a later time.

Figure 2:
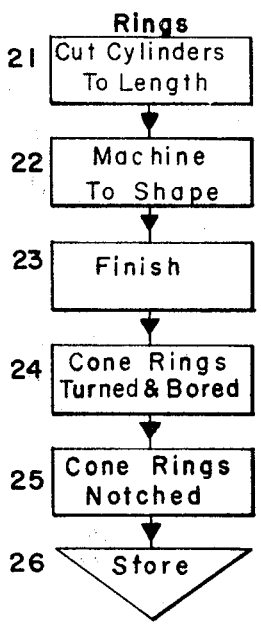
FIG. 2 is a flow chart showing the steps of manufacturing the individual rings used in the device of this invention.

The four rings 92, 93, 94 and 96 are all formed from cylinders of the appropriate diameter and thickness. The first step in forming the rings, as shown in step 21 of FIG. 2, is to cut the cylinders to the appropriate length for each of the rings. Each ring is then machined to shape as shown in step 22. The shaped ring from step 22 is finished in step 23 by deburring, cleaning, and the like. Rings 92, 93 and 94 may then be placed directly into storage shown at step 26, but the cone rings 96 are turned and bored to the proper dimensions (step 24), and in step 25, they are notched to fit onto the appropriate portions of the cone 95. The cone rings are then placed into storage 26.

Figure 3:
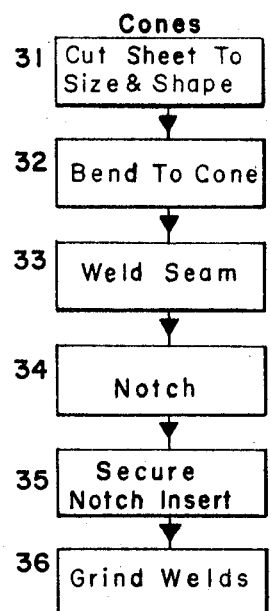
FIG. 3 is a flow chart which shows the steps used in the manufacturing of the cone sub-assembly for the warhead utilizing the principles of this invention.
Figure 4:
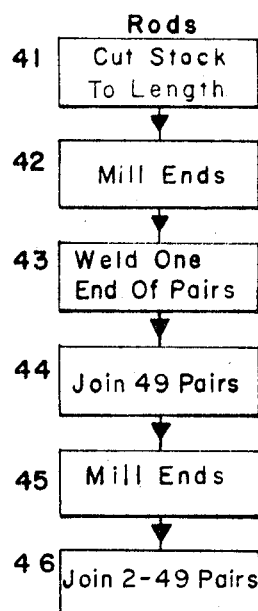
FIG. 4 is a flow chart showing the steps followed in the manufacture of a rod sub-assembly according to the principles of this invention.

The construction of the cones 95 may also proceed at the same time that the cylinders and rings are being made, and they are constructed somewhat similarly to the cylinders 91. As shown in FIG. 3, the first step is to cut the sheet metal from which the cones are formed to the proper size and shape as shown in step 31. This may be done by shearing or by nibbling. In step 32, the sheet material is bent or rolled into the form of a cone, and in the next step 33, the seam of the cone is welded. After welding, in step 34, the end of the cone 95 is notched. Inserts are secured in the notches of the cone 95 by welding, as shown in step 35, and all of the welds including the notch insert welds are ground smooth in step 36 prior to placing the cones in storage in step 37.

While the cylinders, the rings, and the cones are being made, the rod assembly formed of rods 98 and 99 can also be constructed. The rod stock material is received in bundles of long rods having a generally rectangular cross section. The stock material is first cut into appropriate lengths as shown in step 41 and the bundles of short rods are then milled to the proper length for working as shown in step 42. The bundles of rods are then disassembled, and pairs of rods are welded together at one end. The type of weld and the necessity for care in the weld are discussed in detail in the patents mentioned above and also in United States Patents 3,219,791 and 3,225,172, both assigned to the United States. However, it has been found that arc welding in an inert atmosphere produces excellent results if certain precautions are maintained. The welds produced by this method may be produced by automatic equipment, and they are as effective as the resistance welds produced in accordance with the patents. A large number of pairs of rods may be welded together at one end as mentioned in step 43, and then 49 pairs are joined together to form a quarter-mat, as mentioned in step 44. At this stage, some of the pairs of rods which were formed in the same batch as those making up the 49 pair quarter-mat are cut approximately in the middle and are tested in a tensile testing machine for minimum strength. When the tested welds prove themselves, the quarter-mats thus formed are milled so that the welds are slightly below the surface of the rods. After milling, the quarter-mats, as set forth in step 46, are joined together in pairs to form half-mats having 98 pairs of rods each. The half-mats, as shown in step 47, are heat treated and annealed in an inert atmosphere oven for an interval of time sufficient to relieve the stresses which may have been formed in them. The mats are then deburred, by means of specially designed jigs if desired, and degreased to clean them. These are steps 48 and 49. Two half-mats are joined together and an additional pair of rods is then added to form the final mat. To insure the proper and uniform spacing between the rod pairs, Mylar spacers are inserted between each pair at three different points along the length of the rods, and the mats are rolled into cylinders so that they can be easily handled and stored. These are steps 51, 52, 53 and 54. Several of the above described steps can be performed with the aid of special tools to reduce the time required and to improve the uniformity and the quality of the final device. These steps are described in more detail below.

In step 11, the stock sheet material is cut to size for the cylinder 91. This may well be done by shearing since the shape is a simple one. The standard type of welding used in this manufacture of the warhead is arc welding in an inert atmosphere. For welding the seam of the cylinder as shown in step 13, an automatic arc welding machine which uses a flow of argon to establish an inert atmosphere is used. The machine generally comprises a jig for supporting the cylinder in place with clamps to hold the sheet material to shape. The arc electrode, which is tungsten, is supported in an arm movable to traverse the seam at a speed selected to meet varying conditions. The tip of the tungsten rod is sharpened, and to reduce the wear on it, a pulse of high frequency energy is used to start the arc. The weld is cleaned by grinding so that the surface of the weld is at the same level as the surface of the sheet. The cylinder is made slightly undersize, and it is then placed upon a hydraulically expanding mandrel which expands it to the exact size required. In this manner, the diameter of the cylinder 91 can be kept within very close tolerances.

The cones 95 are formed in much the same manner as the cylinders 91. However, since the shape of the cone is somewhat more complex than the shape required for the cylinder, the sheet stock from which the cone is formed is better cut by nibbling. This provides a rapid method for cutting the sheet to shape without the maneuvering which would be required if a shear were used. The cone 95 is rolled about a fixture, and the seam is welded on the automatic seam welding machine in the same manner as is the seam of the cylinder 91. The fixture supporting the cone is tapered to support the seam at a fixed distance from the tungsten electrode, and the electrode support arm is set to travel a shorter distance than when the cylinder 91 is welded. When the cone has been formed, the wide portion of the cone is cut adjacent the edge and heavier inserts are added to the cut-out portion. The inserts are welded into place, and all of the cone welds are ground smooth. The inserts provide a means for lifting the entire assembly both during manufacture and for later loading when hoists are used.

There are several rings or flanges which are used in the final assembly. On the cylinder 91 itself, there are two rings with intricate cross-sections and an end flange. On the cone 95, there is an end flange. The aft flange 92 and the cone flange 96 are similarly formed from short lengths of cylinders which may be made of cast steel. The cylinder stock is cut to length by sawing, for example, and the cut pieces are then cut to the general form desired. As shown in FIG. 7, the rings 93 and 94 are tapered, and a substantial amount of material must be removed from the original cylindrical piece to form the tapered shapes desired. This preliminary shaping is performed before the rings are mounted on the cylinder. Final machining to size and shape is performed after the rings are mounted in place on the cylinder. In addition, the cone rings 96 are cut from cylinders which have a larger inside and outside diameter and wall thickness than those from which the cylinder rings are formed. Preliminary machining on the interior and exterior surfaces is performed before the flange 96 is mounted on the cone. The cut-outs are also made by milling before the flange 96 is mounted.

When the rods 98 and 99 are cut from the stock material, they are cut a bit longer than necessary to insure an adequate length of rod even though there may be some shifting around in the bundle. While the cut rods are still bundled, they are milled to approximate size at both ends. The end milling is performed by a pair of milling cutters which are precisely mounted on a common shaft and separated by a distance which is the desired length of the rod. Thus, the entire bundle of cut rods can be milled to size at the same time and in the same operation. The welding of the rod ends is performed in an automatic machine which provides for a short weld completely through the rod and a longer stitch on one side. This is described in the above mentioned patent to Nooker. However, where Nooker recommends resistance welding, this method utilizes arc welding in an inert atmosphere. A pair of arcs is established between the pair of rods and a pair of spaced pointed tungsten electrodes by means of pulses of high frequency energy. The starting pulse avoids the necessity of contacting the work with the electrodes and permits closer control of the electrode spacing. During the weld time, which lasts for about 7 seconds, a stream of argon flows over the arcs at a rate which ranges from 10 ft./hr. to 40 ft./hr. The two tungsten electrodes are arranged horizontally with the rods between them. Thus, the weld is made horizontally. To avoid the running out of the puddles formed by the arcs, the rods are held in position by a pair of jaws which are cooled. Once the arc has been established, the electrodes remain in position for a few seconds to preheat the rods, and then they are moved hydraulically along the rods, one electrode moving a greater distance than the other to form the stitch. The weld is automatically terminated, the jaws are opened, and the welded rods are ejected. The welds produced by this method are remarkably uniform in size, appearance and performance. When a plurality of welded pairs of rods are to be connected together to form a quarter-mat, they are welded in the same machine that the pairs are prepared. One rod of one pair to be welded is displaced and the other is placed in position in the machine. In a similar manner, one rod of the other pair is displaced and the other is placed in position to be welded. Then when the machine is actuated, one rod of each of two pairs is welded together. Additional pairs are added on until the quarter-mat is formed. Similarly, the quarter-mats are joined together in the welding machine, and half mats are joined to form a single full mat. By using the same machine to produce all of the welds in a mat, a great degree of uniformity is achieved and better performance is assured.

Inspection is, of course, necessary at each stage to insure the holding of tolerances and the quality of both the materials and the workmanship. In preparing rod mats, when the pair of rods are being welded, test pairs are made for each 25 regular pairs. The test pairs are welded together at both ends, then cut in half, opened up to provide means for gripping in test equipment, and then tested for tensile strength. The mats made from the rods and the test samples are both marked with the same identification so that a check on the quality of the mats is readily maintained. For best results, it has been found that mats made from quarter-mats which bear widely separated serial numbers operate the best.

When a mat has been made from the quarter-mats, the welds are inside the rods. That is, the rough portion of the weld lies between adjacent rods rather than on the top or bottom sides. Before the mat can be used, to insure the proper spacing between the adjacent rods, the welds are ground smooth. To accomplish this, a multi-wheel grinder or cutter can be used with the space between the adjacent wheels equal to the width of the rods less the amount to be removed. Stops are provided and fingers are arranged to separate adjacent rods so that the mat can be placed on a table, the rods separated enough to permit the fingers to slip between them, and the mat pushed forward toward the cutters. The stops prevent the cutters from cutting past the welds. Multiple cutters are used to smooth several rods at once and reduce time.

When the mat is assembled onto the cylinder, there may be some problems with equal spacing between adjacent rods. This is readily eliminated by using spacers at several points between the individual rods. It has been found that strips of a dimensionally stable tape, to one side of which a pressure sensitive adhesive is applied, serves this purpose quite well. For example, strips of mylar tape approximately 0.001" thick with a thin coating of pressure sensitive adhesive on one surface are rapidly applied to one side of a stretched-out mat at three spaced locations. When the mat itself was stretched, adjacent rods were spread apart. After the tape is applied, it is rapidly cut between adjacent rods and just as rapidly pressed between the rods by a finger pressure. The same spacing between the rods is then assured at each end and in the center. This operation is shown as step 52 in FIG. 4. In addition, the narrow width of tape which separates the rods from each other also serves to reduce the friction between adjacent rods when the warhead is exploded and tends to assure a more even and uniform expansion of the circle of rods.

Once the spacers have been applied to the mat so that there are two thicknesses between each pair of rods at the three locations, the mat is ready to be joined into a cylinder as mentioned in step 53. The mat is carefully wrapped around a mandrel and the two end rods are hand welded to form the final joints. The welds are made with a pointed tungsten electrode similar to the machine welds. To relieve stresses at this point, the weld is maintained at a low red heat for approximately two minutes. The rod bundle is then held in shape by means of O-rings placed around the outside. The mandrel can then be removed. After the bundle of rods has been completed, they are stored vertically on suitable soft bases such as wooden rings. When the bundles are handled, they are lifted by means of the rings. At this point, the bundle of rods must be handled with care because a damaged rod cannot be removed; instead, the whole bundle must be scrapped.

By now, most of the major sub-assemblies have been completed and quantities of each have been placed in storage. The individual sub-assemblies are removed from storage when an entire warhead is to be assembled. Of course, several advantages of this method can be seen at this point. More steps are required to manufacture the cone assemblies and the rod bundles than to make either the cylinders or the rings. This is particularly true since the mats of rods must be heat treated and substantial amounts of time are required for this. Therefore, rather than hold up production of an entire warhead until each required sub-assembly is individually completed, the individual sub-assemblies can be manufactured separately with suitable planning so that equal quantities of each are available at the same time. This conserves manpower and manufacturing facilities.

Figure 5:
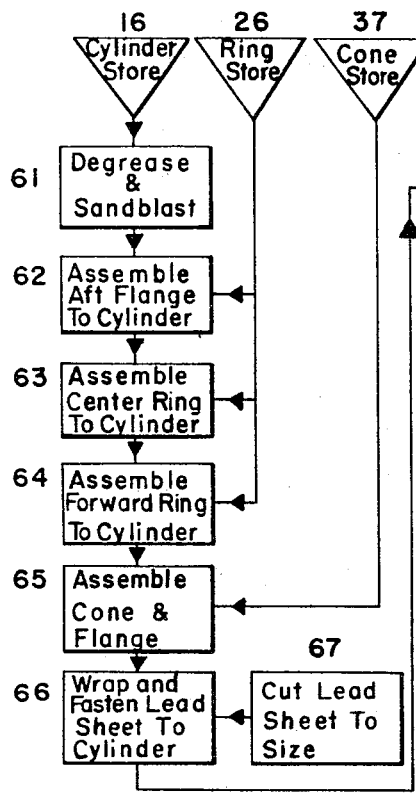
FIG. 5 is a flow chart indicating the assembly of the warhead itself using the various sub-assemblies in accordance with the principles of this invention.

As shown in FIG. 5, the starting point for the assembly of the warhead is the storage of the cylinders, the rings, the cones and the rods. Actually, these are abbreviations for the assemblies of these items. The cylinders are removed from storage where they were placed in step 16 and, as shown in step 61, are degreased and sand blasted to clean off the surface for subsequent processing. After cleaning, the rear flange 92, or ring, is placed on one end of the clean cylinder 91 and is welded in place. One face of the ring 92 is flush with the end of the cylinder 91, and, where the two join, the weld material is built up to be later ground smooth. Welding is again accomplished by means of a pointed tungsten electrode. No melt-through of the cylinder 91 is permitted, and the cylinder is preferably preheated to a temperature of somewhere in the neighborhood of 200° F. to expand it to fit tightly within the ring 92 to better hold it in place during welding. The middle ring 93 is then slipped over the other end of the cylinder 91 and positioned at the correct distance from the end ring 92. When it is positioned, the middle ring 93 is welded into place by means of a sharply pointed electrode. A fillet of weld material is built up on the aft side of the middle ring 93 by the fusion of a welding shoulder which was formed when the ring was machined.

The fore ring 94 is slipped on the end of the cylinder 91 but is not fastened in position. The cylinder 91 with the rings 92, 93 and 94 assembled thereon is then placed in a suitable lathe so that the ends of the cylinder, the aft ring 92, and the contour of the ring 93 may be finally finished. At this point, the intricate cross section of the middle ring 93 is finally shaped. Machining at this point to the final dimensions required helps eliminate any possible distortion produced during the welding of the rings to the cylinder and creates perpendicular faces which the rod ends must meet flush at later assembly. The fore ring 94 is used to provide support at one end of the cylinder while the assembly is being turned in the lathe. An expanding chuck is used, and the chuck can be expanded against the heavy ring 94 to hold the assembly firmly in place during working without distorting the cylinder 91. The ring 94 is left floating, however; it is not firmly attached to the cylinder 91 at this time.

After the aft ring 92 and the middle ring 93 have been shaped, the cone sub-assembly is attached. The cone 95 and the cone ring or flange 96 serve to help support the warhead when it is standing upright. However, even though it is used primarily for support, since the warhead itself is projected through space in use, the cone and cone flange must be symmetrical and balanced so as not to upset the balance of the entire system. Care is taken in the construction of this sub-assembly, as with all of the working parts of the device. The middle ring 93 was machined with a shoulder located intermediate the two edges. The narrow end of the cone 95 is placed against this shoulder and welded into position. The welding is performed on a circumferential arc welder which uses a sharpened tungsten rod as the welding electrode. While the cylinder 91 is held in place with the rings 92 and 93 in position and the cone 95 against the shoulder on the ring 93, the entire assembly is rotated, and the arc is maintained between the electrode and the cone.

Before mounting the rods 98 and 99 on the cylinder 91, a softer base for the rods is provided by covering that portion of the cylinder 91 with a sheet 90 of lead. The surface of the cylinder 91 is sandblasted to clean it and to roughen it slightly. Then the ring 94 is moved forward an eighth of an inch or so to provide sufficient space for the lead sheet 90 to fit in comfortably. A length is cut from the roll of lead sheet stock. Then the ends of the cut sheet are cleaned with steel wool and alcohol back a distance of about ½ to 1 inch. After the lead sheet is wrapped around the cylinder 91, it is clamped in place and the excess is trimmed off. The seam is then spot soldered with a suitable solder such as an indium-tin solder to hold it in place. Before the final soldering is completed, the sheet of lead 90 is arranged on the cylinder 91 so that the two seams, that of the cylinder 91 and of the lead covering 90, are separated by about 135°. Then the entire seam is soldered with as little solder buildup as possible. After soldering, the seam is filed and sanded smooth. It is often desirable, when filing and sanding a soft material such as lead, to place thin steel shims on both sides of the seam so that excess material is not removed. The lead sheet is compressed against the cylinder by using foam rubber, thus assuring intimate contact and absence of voids which are detrimental to performance.

After inspection of the lead sheet and the soldering, the bundle of rods is placed on the cylinder as shown in step 68. The bundle was assembled as a cylinder, standing on end on a ring of wood for ease of handling. The inside opening in the ring of wood is slightly larger than the diameter of the cylinder 91 and the ring 94 so that it slips readily over the cylinder and ring with the cylinder 91 standing vertically on the flanges 92 and 96. The wooden support carrying the bundle of rods is lowered over the cylinder so that the completed bundle surrounds the cylinder 91. The cylinder of rods was in a slightly expanded condition when it was placed on end on the wooden ring. With the ring of wood supported and the bundle of rods surrounding the cylinder 91, the bundle of rods is gradually moved off the wooden support and contracts around the cylinder 91. The wooden support is then withdrawn. One end of the rod bundle is firmly tapped against the middle ring 93 so that the ends of the rods 98 and 99 are firmly and evenly contacting the inside surface of the ring 93. Ring 94 is then tapped into place snugly against the rods. To hold the rod bundle in place on the cylinder 91, three inflatable tubes are wrapped around the bundle of rods at three spaced locations and are then inflated.

The inflatable tubes serve to keep the rods relatively immobile on the cylinder 91 while they are being aligned and spaced. This is the operation shown in block 69. When the bundle of rods was slipped off the wooden support and onto the cylinder 91, the individual rods moved into what can be considered a convenient position. For proper operation of the warhead, the individual rods must be aligned with the longitudinal axis of the cylinder 91, parallel to each other, and spaced apart by equal amounts. To perform this operation, cylinder 91 is mounted on a mandrel which is horizontally positioned in an indexing head. Adjacent the rod assembly on the cylinder 91, and parallel with the longitudinal axis of the cylinder 91 is an accurately located support which carries three withdrawable spacing fingers adjacent the space between rods in the rod bundle. The three fingers on the support are spaced so that one finger is approximately one inch from one end of the rod bundle, a second finger is approximately one inch from the other end of the rod bundle and the third finger is approximately centered on the rod bundle. The fingers are then individually moved to the space between rods and the rods are individually moved until all three fingers are easily inserted and removed from the space between rods. The head is then indexed one position to a space between rods a few spaces away, and the procedure is again repeated. This procedure is followed through several rotations of the cylinder 91 until all of the spaces between rods have been adjusted and the rods are equally spaced from each other and parallel with the axis of the cylinder 91. The assembly is then coated at several locations with a layer of a synthetic resin which, when set, tends to hold the rods in position. The end ring 94 is again forced against the ends of the rods 98 and 99, then cylinder 91 is placed on the support mandrel of a cylinder welding machine.

As shown in step 71, the rods are then secured to the cylinder 91. This is accomplished by welding the ends of the rods 98 and 99 to the rings 93 and 94. The welding procedure is accomplished as in the manner mentioned above by using an electric arc between a pointed tungsten electrode and the members being welded. The arc is ignited by a starting pulse of high frequency energy, and the welding takes place in an inert atmosphere such as one of argon. One satisfactory method of welding the rods to the rings 93 and 94 is to support the tungsten electrode in a fixed position with respect to the axis of the cylinder 91 and then to rotate the cylinder 91 at a fixed rate of speed once the arc has been established to accomplish the weld. The results are uniform, rapid, and completely satisfactory. Each rod is welded with identical current conditions for uniformity. To complete the portion of the warhead described herein, a sheet of steel is cut to the proper size to provide an outer covering 97 surrounding the rods 98 and 99. This final covering is fitted around the cylinder 91 over the outside of the rods 99 and surrounding the outer surface of the flanges 93 and 94. The skin 97 is clamped tightly and the ends are trimmed until the two ends butt. The seam is then welded using an arc welder, and the weld, when cooled, is carefully ground to remove burrs and to provide a smooth outer surface. Subsequent to the placing of the skin around the rods 99, the device should be accurately formed and dimensionally stable, and, all parts thereof, should react uniformly under sudden and high forces.

This invention has described a new and improved system, method and process for the manufacture of continuous warhead rod devices which require very close tolerances and a high degree of reliability. It must be recognized that rod projectiles which require high velocity (over 4,000 ft./sec.) of ejection from rest must be manufactured with high precision to withstand greater explosive forces. This invention particularly describes the use of tolerance control methods to obtain assemblies with such precision. Heretofore, such assemblies have been accomplished on a custom-made or one-item base wherein the various parts were assembled, piece by piece, as the device was built. The method described herein utilizes many principles of mass production and has proven itself to be feasible, workable and economical. It is realized that the above description may indicate to others in the art additional ways in which the principles of this invention may be used without departing from the spirit thereof, and it is, therefore, intended that this invention be limited only by the scope of the appended claims.

What is claimed is:

1. A method of manufacturing continuous rod warheads at varying rates of assembly without multiple tooling, said method comprising the steps of:
 (a) constructing a plurality of cylindrical bases for said warhead from stock sheet material to close and accurate dimensions,
 (b) storing said plurality of cylindrical bases,
 (c) constructing a plurality of support and spacer rings adapted to mount on said cylindrical bases,
 (d) storing said plurality of rings,
 (e) constructing a plurality of truncated hollow cones each adapted to fit on one end of said cylindrical bases to provide a support for said cylindrical base when vertically disposed,
 (f) storing said plurality of truncated cones,
 (g) constructing a plurality of continuous rod assemblies to close tolerances, each of said rod assemblies being formed by cutting into identical lengths a plurality of short rods, and then fastening together adjacent rods only at one end to form a plurality of pairs of rods, fastening together at alternate ends pluralities of pairs of rods to form mats, and forming each mat into a cylinder comprising a single rod assembly,
 (h) storing said plurality of continuous rod assemblies,
 (i) and assembling a desired number of single warheads each of which comprises one of said stored cylindrical bases, one of said stored truncated cones, several of said stored rings and one of said continuous rod assemblies, said warhead assembly comprising the following steps:
 (j) taking from storage and mounting a set of said rings on a cylindrical base from storage,
 (k) taking from storage and mounting a cone on one end of said cylindrical base with the small diameter end of said cone mounted against one of said rings and the large diameter end of said cone flush with the one end of said cylindrical base,
 (m) and taking from storage and mounting one of said continuous rod cylinders about the external surface of said cylindrical base.

2. The method defined in claim 1 wherein the step of constructing each cylindrical base comprises:
 (a) cutting a rectangular sheet of material to size,
 (b) bending said sheet material into a cylindrical form having a diameter slightly smaller than desired,
 (c) welding together the two butt ends of said cylindrical sheet,
 (d) cleaning said weld, and
 (e) expanding said cylinder thus formed to the desired diameter.

3. The method defined in claim 1 wherein the step of constructing each of said truncated hollow cones comprises the steps of:
 (a) cutting from stock sheet material a piece of the required size and shape,
 (b) rolling said piece of sheet material about a support to form a truncated cone,
 (c) welding the butt ends of said sheet material,
 (d) notching the large diameter end of the cone thus formed,
 (e) attaching in the notches formed in said cone insets of heavy material to provide access openings for handling said warhead,
 (f) and grinding smooth all joints on said cone.

4. The method defined in claim 1 wherein said step of constructing each of said plurality of continuous rods comprises:
   (a) cutting a plurality of stock rods to the length of the rod cylinder,
   (b) attaching together pairs of said cut rods at one end only,
   (c) attaching together groups of pairs of rods by fastening one free end of one pair to a free end of each of adjacent pairs with the pairs facing each other to form a double thick mat of rods,
   (d) fastening together the free ends of said mat to form a closed assembly in which the adjacent fastenings of said rods alternate from one end of said rods to the other to form an expandable ring with the joints serving as hinges,
   (e) and cleaning said joints.

5. The method defined in claim 1 where the step of constructing each of said truncated hollow cones comprises the steps of:
   (a) cutting from stock sheet material a piece of the required size and shape,
   (b) rolling said piece of sheet material about a support to form a truncated cone,
   (c) welding the butt ends of said sheet material,
   (d) notching the large diameter end of the cone thus formed,
   (e) attaching in the notches formed in said cone inserts of heavy material to provide access openings for handling said warhead,
   (f) and grinding smooth all joints on said cone.

6. The method defined in claim 5 wherein the step of constructing each of said plurality of continuous rod assemblies comprises the steps of:
   (a) cutting a plurality of stock rods to the length of the rod cylinders,
   (b) attaching together pairs of said cut rods at one end only,
   (c) attaching together groups of pairs of rods by fastening one free end of one pair to a free end of another pair into a rod assembly,
   (d) fastening together the free ends of said continuous rod to form a closed cylinder, in which the adjacent fastenings of said rods alternate from one end of said rods to the other to form an expandable ring with the joints serving as hinges,
   (e) and cleaning said joints.

7. A method of manufacturing a continuous rod warhead which comprises a hollow cylinder for containing a high explosive, a soft skin on the outside of said cylinder for providing a soft bed for a continuous rod projectile, a continuous rod projectile mounted on the outside of said cylinder, a pair of shaped rings mounted on said cylinder with one ring at each side of said rod projectile, a support cone and a pair of support flanges mounted on one end of said cylinder, said method comprising the steps of:
   (a) forming a cylinder of sheet material by bending to shape a cut sheet of said material, welding the ends of the sheet together, and expanding the cylinder thus formed by controlled means to ensure that the diameter of said cylinder falls within prescribed close limits;
   (b) forming a plurality of shaped rings by cutting a preformed cylinder to appropriate lengths, shaping and sizing the rings formed by said cutting to the rough shapes and sizes desired;
   (c) forming a truncated cone of sheet material by bending to conical shape a cut sheet of said material, welding together the butting edges of said sheet, notching said sheet material at several places along the base of said cone, and fastening into position in the notches so formed inserts capable of withstanding heavy loads for handling the warhead;
   (d) forming a continuous rod assembly capable of rapid expansion into a growing ring projectile under applied forces by identically fastening together pairs of similar short rods at one end only, identically fastening a plurality of pairs of rods together into a single folded rod by attaching the free end of each rod of a pair to the free end of a rod of another pair, and establishing in the fastening at each end an energy absorbing portion; and
   (e) assembling into a plurality of single warheads the components previously formed; the assembly of each warhead comprising the steps:
     (1) mounting on a cylinder an aft ring, a middle ring and a fore ring;
     (2) attaching said aft and said middle ring to said cylinder;
     (3) finally shaping said rings to the desired shape and size;
     (4) notching a ring and attaching it to the large diameter end of said truncated cone to form a rigid flange thereon with the notches in said ring and in said cone aligned;
     (5) fastening said cone assembly onto said cylinder with the small diameter end of said truncated cone attached to said middle ring and with the ring on said cone aligned with the aft ring on said cylinder;
     (6) fastening a sheet of material softer than the material of said cylinder about said cylinder in the space between said fore and said middle rings;
     (7) mounting on said soft material said continuous rod assembly;
     (8) aligning the space-between-rods of said rod assembly with the longitudinal axis of said cylinder;
     (9) fastening said rod assembly to said cylinder by attaching the ends of the assembly to said fore and middle rings; and
     (10) covering said rod assembly with an external protective cover.

References Cited

UNITED STATES PATENTS

| | | | |
|---|---|---|---|
| 3,320,888 | 5/1967 | Churchill | 102—67 |
| 3,223,036 | 12/1965 | Anspach | 102—67 |
| 3,298,309 | 1/1967 | Philipchuk | 102—67 |
| 3,249,050 | 5/1966 | Cordle et al. | 102—67 |
| 3,228,336 | 1/1966 | Kempton | 102—67 |

RICHARD H. EANES, Jr., Primary Examiner